G. MINOR.
WHEELBARROW.
APPLICATION FILED JULY 27, 1910.
990,822.
Patented Apr. 25, 1911.
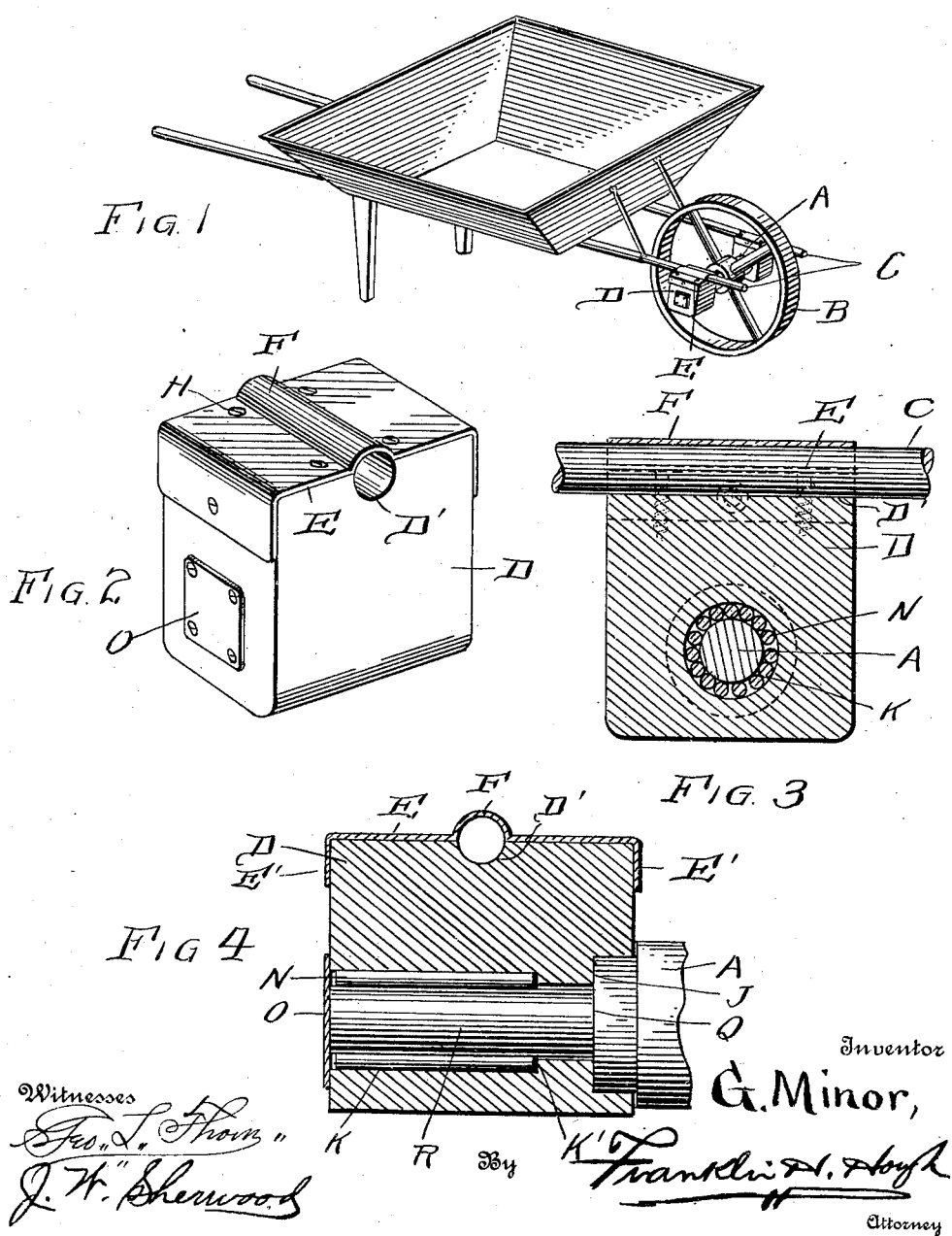

UNITED STATES PATENT OFFICE.

GUSTINE MINOR, OF GREEN BAY, WISCONSIN.

WHEELBARROW.

990,822.  Specification of Letters Patent.  Patented Apr. 25, 1911.

Application filed July 27, 1910. Serial No. 574,116.

*To all whom it may concern:*

Be it known that I, GUSTINE MINOR, a citizen of the United States, residing at Green Bay, in the county of Brown and State of Wisconsin, have invented certain new and useful Improvements in Wheelbarrows; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in wheel barrows and cylindrical roller bearings for the shafts thereof and comprises a simple and efficient apparatus of this nature having various details of construction and combinations and arrangements of parts which will be hereinafter fully described and then specifically defined in the appended claims.

I illustrate my invention in the accompanying drawings, in which:—

Figure 1 is a perspective view of a wheel barrow made in accordance with my invention. Fig. 2 is an enlarged detail view of the bearing box having roller bearings therein. Fig. 3 is a sectional view through the bearing box, and Fig. 4 is a view taken in a plane at right angles to the view shown in Fig. 3.

Reference now being had to the details of the drawings by letter, A designates the axle of a wheel barrow having a wheel B mounted thereon, and C designate the side rods or bars of a wheel barrow to which the handles are fastened, and D the bearing boxes, each of which is grooved as at D' at its upper end for the reception of the bars C, which latter are cylindrical or may be of other shape, if desired.

E, E are plates with flanged ends E' which fit over the opposite sides of the box and said plate E is provided with a concaved portion F which is adapted to engage and clamp the rod C of the wheel barrow frame and hold the same in an adjusted position by friction, suitable screws H being passed through apertures in the plate and also in the flanges to hold the same securely in place, said screws engaging the bearing, which is made preferably of wood. Said bearing has a chamber K in which is a shoulder K' and within said chamber is a series of cylindrical rollers N, the longitudinal movements of which are limited in one direction by said shoulder and their movements in opposite direction by the plate O which is fastened to the outer face of the boxing D and adapted to cover the opening therein. A second shoulder, designated by letter J, is formed in said bearing box and against which the shoulder Q of the shaft is adapted to bear, the spindle R of said shaft being adapted to pass entirely through the box and having a bearing upon the series of cylindrical rollers. Each end of the shaft is equipped with a similarly constructed bearing box and each fastened to a rod or a bar C of the frame of the wheel barrow by the clamping plate E.

From the foregoing, it will be noted that, by the provision of a wheel barrow shaft having bearings as shown, access may be readily had to the ends of the boxing in which the cylindrical rollers are mounted and the bearing boxes may be held in relative positions to the bars C of the frame to bring the wheel nearer to or farther from the load to be carried upon the wheel barrow.

What I claim to be new is:—

1. A wheelbarrow comprising a frame having two rods, bearing blocks, each recessed upon its upper surface to receive one of said rods, a plate fastened to the upper surface of each block and having a concaved portion coöperating with the groove to clamp and hold the block in adjusted position.

2. A wheelbarow comprising a frame having two rods, bearing blocks, each recessed upon its upper surface to receive one of said rods, a plate fastened to the upper surface of each block and having a concaved portion coöperating with the groove to clamp and hold the block in adjusted position, the ends of said plate bent at an angle and fastened to the opposite faces of the block.

In testimony whereof I hereunto affix my signature in the presence of two witnesses.

GUSTINE MINOR.

Witnesses:
C. W. LOMAS,
JOHN F. DOCKRY.

Copies of this patent may be obtained for five cents each, by addressing the "Commissioner of Patents, Washington, D. C."